(12) United States Patent
Giesy

(10) Patent No.: US 7,081,147 B2
(45) Date of Patent: Jul. 25, 2006

(54) EASY-TO-TURN COMPOST BIN

(76) Inventor: Philip John Giesy, 16516 Simonds Rd. NE., Kenmore, WA (US) 98028

( * ) Notice: Subject to any disclaimer, the term of this patent is extended or adjusted under 35 U.S.C. 154(b) by 2 days.

(21) Appl. No.: 10/823,044

(22) Filed: Apr. 12, 2004

(65) Prior Publication Data

US 2004/0261480 A1    Dec. 30, 2004

Related U.S. Application Data

(60) Provisional application No. 60/463,385, filed on Apr. 16, 2003.

(51) Int. Cl.
*C05F 11/08*    (2006.01)

(52) U.S. Cl. .............................. 71/9; 71/11; 435/290.1

(58) Field of Classification Search ............. 435/290.1, 435/290.2, 290.3, 290.4; 71/9, 11; 220/4.01, 220/4.21, 4.22, 4.26, 913; D9/414, 433

See application file for complete search history.

(56) References Cited

U.S. PATENT DOCUMENTS

| | | | |
|---|---|---|---|
| 3,837,810 A | 9/1974 | Richards et al. | |
| 4,125,394 A | 11/1978 | Wilson | |
| 4,184,602 A | 1/1980 | Moliard et al. | |
| 5,322,793 A | 6/1994 | Yarnell et al. | |
| 5,597,732 A * | 1/1997 | Bryan-Brown | 435/290.4 |
| 5,628,812 A * | 5/1997 | Tempe | 71/9 |
| 5,762,225 A * | 6/1998 | Byrd | 220/6 |
| 6,227,468 B1 | 5/2001 | De Batt et al. | |
| 2003/0157702 A1 | 8/2003 | Bard et al. | |

* cited by examiner

*Primary Examiner*—David Redding
(74) *Attorney, Agent, or Firm*—Gary C. Cohn PLLC

(57) ABSTRACT

A composting box includes a main unit and one or two detachable side panels. In a preferred embodiment, the main unit includes two spaced apart main walls attached at diagonally opposite corners with connecting and spacing members. Each of the detachable side panels is adapted to attach to a side of the main unit. After detaching the side panels, the main unit can be separated from a compost pile. The compost pile is then easily re-transferred back into the main unit, and the side panel(s) reattached. This method provides an inexpensive, labor-saving way to maintain and periodically aerate compost piles.

9 Claims, 5 Drawing Sheets

EASY-TO-TURN COMPOST BIN

CROSS-REFERENCE TO RELATED APPLICATION

This application claims benefit under 35 USC §119 of U.S. Provisional Application 60/463,385, filed Apr. 16, 2003.

BACKGROUND OF THE INVENTION

This invention relates to a composting bin or box and a composting method that is particularly suitable for small-scale operations, such as household or other residential operations.

Composting is a method by which certain kinds of biological materials are broken down to return those materials to a form in which they can be used by plants to promote plant growth. The composting process involves assembling compostable organic matter into a pile where bacteria decompose it into elemental soil-type material. The process is exothermic. Forming the compostable material into a pile helps to reduce heat and moisture loss. The captured heat and moisture create conditions that favor bacterial growth and breakdown of the organic matter. The composting process consumes oxygen. The pile characteristics that cause it to retain heat and moisture operate to prevent air from penetrating the pile. It is therefore necessary to aerate the compost pile periodically to provide the necessary oxygen to sustain the process. This is ordinarily done by mechanically mixing air into the pile.

Composting processes are practiced on scales ranging from industrial to household. For large-scale operations, various types of automated composting equipment are available to mechanically aerate the compost pile. Small-scale composting piles are typically aerated manually or by using small automated equipment. Small-scale automated equipment is often too expensive to purchase and operate to be an economically attractive option. The capacity of these units tends to be small as well. Therefore, manual aeration is the most widely practiced method for household-scale composting operations. Commonly, the compost pile is maintained within a bin, so that it is not dispersed by wind and rain. Aeration is done by turning the pile over within the bin (if the bin is not too full), or by transferring the pile from the bin to another bin or an adjoining area. The ordinary method of accomplishing this is by shoveling or using a pitchfork. These methods are highly labor intensive. They usually require a lot of lifting as the compost must be raised above the height of the bin in order to remove it. The necessary work is difficult for many older, sick or disabled people. Even for younger, healthier people, it would be desirable to make the manual aeration process easier.

Thus, it would be desirable to provide an aeration method and equipment that this inexpensive, easy to operate, and which reduces the manual labor necessary to aerate the compost pile.

SUMMARY OF THE INVENTION

In one aspect, this invention is a composting method comprising maintaining a compostable material in a composting box that includes a main unit and a detachable side panel, wherein the main unit includes first and second main walls held apart and substantially parallel to each other, wherein said detachable side panel forms a wall of the composting box when mounted to said main unit.

In a second aspect, this invention is a composting method comprising maintaining a compostable material in a composting box that includes a main unit and two detachable side panels, wherein the main unit includes first and second main walls held apart and substantially parallel to each other by two connecting and spacing members located proximate to diagonally opposing corners of the main walls, wherein said main walls define opposing first and third sides of the composting box and opposing second and fourth sides of the composting box, and wherein said detachable side panels are adapted (1) to be detachably affixed to said main unit to form opposing walls on said first and third sides of the composting box and (2) to be detachably affixed to said main unit to form opposing walls on said second and fourth sides of the composting box.

The method of the first and second aspects of the invention provides an inexpensive method by which a compostable material can be maintained and aerated. The method is especially useful for maintaining small compost piles, such as single-family residential compost piles. The composting box is of simple construction and can be made with inexpensive, lightweight materials. The composting box facilitates easy aeration of the compostable material in several ways. First, the composting box is readily separated from the compostable material. This is accomplished in the first aspect of the invention by removing the detachable side panel and rolling or sliding the composting box away from the pile. Because of the detachable side panel, it is not necessary to lift the composting box away from the pile.

As discussed more fully below, this is achieved in the second aspect of the invention by removing the side panels and rotating the remaining main unit to one side. This is accomplished without needing to lift either the fully-assembled composting box or the compost pile. After being rotated, the main unit is adjacent the compost pile. The compost pile can then be moved back into the main unit, typically by shoveling or using a pitchfork, and the side panels reattached to again form a four-sided, filled composting box. The shoveling or moving operation aerates the compostable material. This invention allows the compost pile to be moved and aerated using minimal manual labor, because (1) it is only necessary to move the pile by a distance equal to the width of the composting box and (2) it is not necessary to lift the pile above the height of the composting box in order to transfer it back into the box. Much of the pile needs only to be pushed laterally into the relocated composting box. One or both side panels may be re-attached to the main unit after the compost pile has been transferred, as illustrated more fully below.

Another advantage of the invention is that it allows one to keep and maintain a compost pile in a small area of land. Yet another advantage is that the method permits one to simultaneously maintain multiple compost piles with a single composting box.

In a third aspect, this invention is a composting method, comprising a) positioning a composting box on a surface, wherein the composting box includes a main unit and two detachable side panels, the main unit including first and second main walls held apart and substantially parallel to each other by two connecting and spacing members located proximate to diagonally opposing corners of the main walls, wherein said main walls define opposing first and third sides of the composting box and opposing second and fourth sides of the composting box, and wherein said detachable side panels are adapted (1) to be detachably affixed to said main unit to form opposing walls on said first and third sides of the composting box and (2) to be detachably affixed to said main unit to form opposing walls on said second and fourth sides of the composting box, said composting box being positioned such that said main walls are oriented substantially vertically and said detachable side panels are attached to said opposing first and third sides of the composting box and oriented substantially vertically;

b) maintaining a compostable mixture in the composting box under compositing conditions;

c) detaching said detachable side panels from the main unit;

d) rotating said main unit while maintaining said main walls in a substantially vertical orientation, so that (1) the compost box is removed from the compostable mixture (2) said opposing first and third sides of the composting box become oriented substantially horizontally and (3) said opposing second and fourth sides of the composting box become oriented substantially vertically; then e) transferring said compostable mixture back into said main unit and attaching one of said detachable side panels to said second side and the other of said detachable side panels to said fourth side of the composting box.

In a fourth aspect, this invention is a composting box comprising a main unit and two detachable side panels, wherein the main unit includes first and second main walls held apart and substantially parallel to each other by two connecting and spacing members located proximate to diagonally opposing corners of the main walls, wherein said main walls define opposing first and third sides of the composting box and opposing second and fourth sides of the composting box, and wherein said detachable side panels are adapted (1) to be detachably affixed to said main unit to form opposing walls on said first and third sides of the composting box and (2) to be detachably affixed to said main unit to form opposing walls on said second and fourth sides of the composting box.

DETAILED DESCRIPTION OF THE INVENTION

Figure 1:
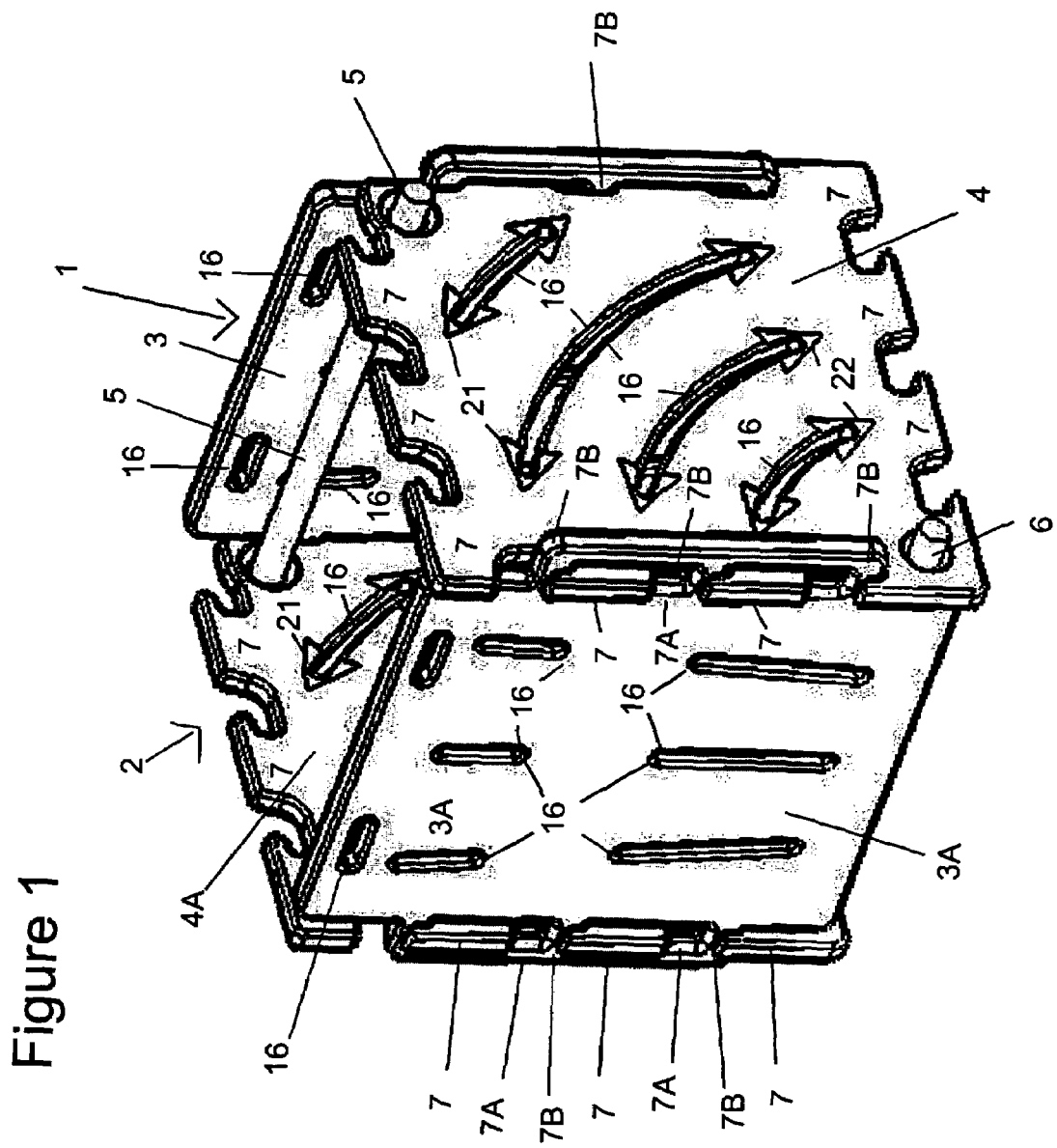
FIG. 1 is an isometric view of an embodiment of a composting box of the invention.
Figure 2:
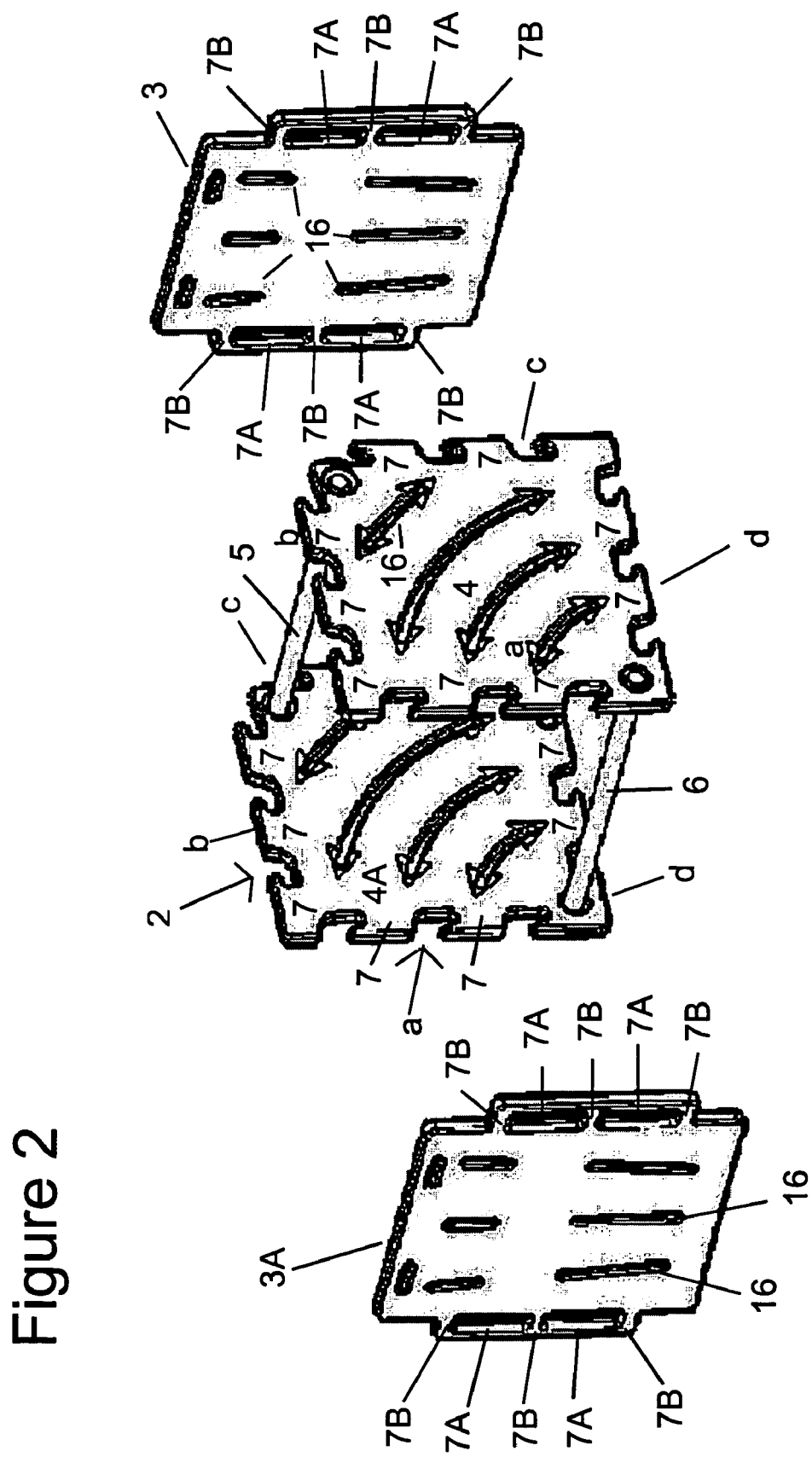
FIG. 2 is an exploded view of the embodiment of the invention shown in FIG. 1.

A preferred embodiment of the invention is illustrated in FIGS. 1–3. Referring first to FIG. 2, composting box 1 includes main unit 2 and side panels 3 and 3A. Main unit 2 includes main walls 4 and 4A. Connecting and spacing members 5 and 6 join main walls 4 and 4A together, so that main walls 4 and 4A are spaced apart from each other and are substantially parallel to each other. Connecting and spacing members 5 and 6 are connected to main walls 4 and 4A at diagonally opposite corners of the main walls; as shown in FIG. 2, connecting and spacing member 6 is at the lower left corner and connecting and spacing member 5 is at the upper right corner of main walls 4 and 4A. The diagonally opposing placement of connecting and spacing members 5 and 6 allows the composting box to be tilted away from a compost pile within the box without having connecting and spacing members 5 and 6 pass through or disturb the pile, except perhaps slightly at or near the corners where connecting and spacing members 5 and 6 are located.

Main walls 4 and 4A define first, second, third and fourth sides of the composting box. These are designated by a, b, c and d, respectively, in FIGS. 2 and 3. The first and third sides oppose each other, as do the second and fourth sides.

Side panel 3 is adapted to be detachably affixed to the third side (c) of the composting box and either or both of the second (b) and fourth (d) sides. Side panel 3A is adapted to be detachably affixed to the first side (a) of the composting box and either or both of the second (b) and fourth (d) sides. At least one of the side panels is adapted to be detachably affixed to the second side (b) and at least one of the side panels is adapted to be detachably affixed to the fourth side (d). Preferably (and as shown), each of side panels 3 and 3A can be detachably affixed to any of the four sides (a, b, c or d) of the composting box defined by main walls 4 and 4A.

In the embodiment shown in FIGS. 1 and 2, side panels 3 and 3A are detachably affixed to main walls 4 and 4A through a series of hook-and-eye type fasteners. Each of first, second, third and fourth sides (a–d) of main walls 4 and 4A includes a set of hooks 7 (three on each side, in the embodiment shown) that extend from the respective edges of main walls 4 and 4A. Side panels 3 and 3A have reciprocating eyes defined by openings 7A and crossbars 7B. Openings 7A are adapted to fit over and receive hooks 7. When side panels 3 and 3A are properly positioned on the composting box, hooks 7 extend around crossbars 7B to retain side panels 3 and 3A in place. The latch design shown is simple, inexpensive and easy to operate, but is not critical to the invention. A variety of clasps, locks and other latching mechanisms can be used as desired.

FIG. 1 illustrates composting box 1 with side panels 3 and 3A being affixed to the first and third sides. The assembled composting box 1 thus forms a four-sided container open at the bottom and at the top.

Main walls 4 and 4A and side panels 3 and 3A are conveniently made of a structural material such as wood, plywood, metal, a thermoplastic or thermoset polymers and the like. The material of construction is not particularly critical provided that the panels have enough strength to maintain their shape during use. The materials of construction should be resistant to moisture, bacterial action, and the temperatures generated in the composting process. Thermoplastic or thermoset polymers are preferred due to their generally light weight. Recycled thermoplastics are especially suitable. The main walls and side panels may be hollow to further reduce weight, provided their physical integrity is not compromised. Polymeric walls and panels can be made in a variety of molding processes.

Main walls 4 and 4A preferably have interior surfaces (i.e., facing the inside of the composting box) that are substantially free of protrusions that inhibit the movement of the box relative to a compost pile contained in the box, as described below.

Connecting and spacing members 5 and 6 are conveniently made of any rigid material such as those described with respect to the main walls. Metal bars, wood, thermoplastic or thermoset polymers are all useful. Thermoplastic or thermoset polymers may be reinforced with fillers and/or fibers. Connecting and spacing members 5 and 6 are adapted to fasten to main walls 4 and 4A so that main walls 4 and 4A are maintained at a fixed distance from each other, and approximately parallel to each other. Any kind of fastening means can be used, but it is preferred that the main unit can be easily disassembled for shipping and storage. A preferred fastening method, as shown, is to provide ends on connecting and spacing members 5 and 6 that extend through main walls 4 and 4, as shown in FIG. 1. The ends have threads, a hole, a slot, a ridge or other means by which it can be secured in place, such as by using a nut, cotter pin, clip or similar apparatus.

The dimensions of the composting box can vary considerably. A convenient box for residential applications is approximately a cube having a length of about 15–60 inches on each side. A preferred size is an approximate cube having a length of about 24–48 inches on a side. A more preferred size is an approximate cube having a length of about 24–40 inches on a side. Composting boxes of these sizes strike a balance between weight and capacity that is suitable for many residential composting operations.

Figure 3A:
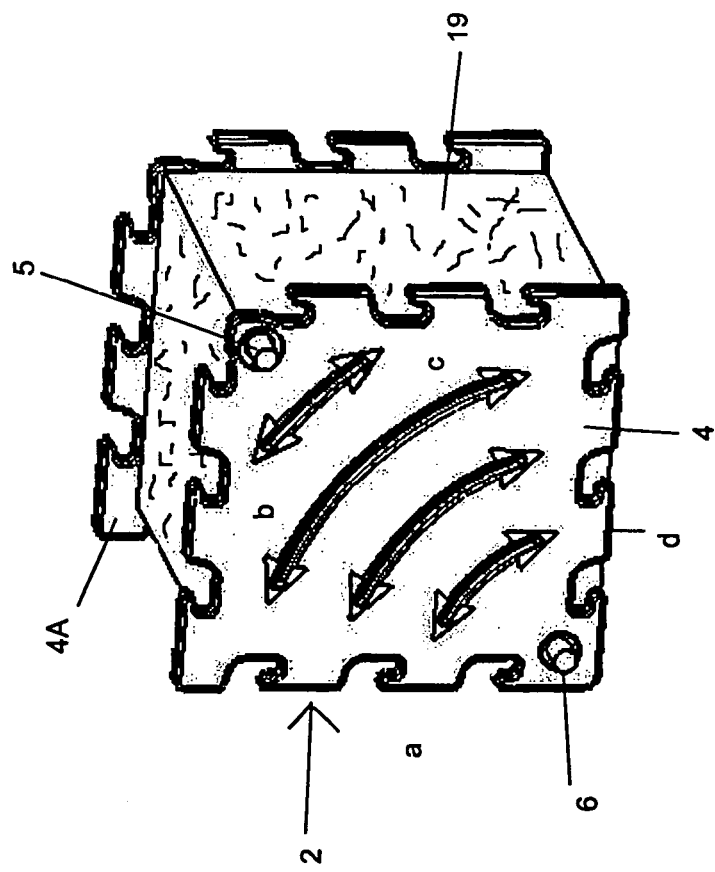
FIG. 3a–f are series of six views illustrating the operation of the embodiment of the invention shown in FIGS. 1 and 2.
Figure 3B:
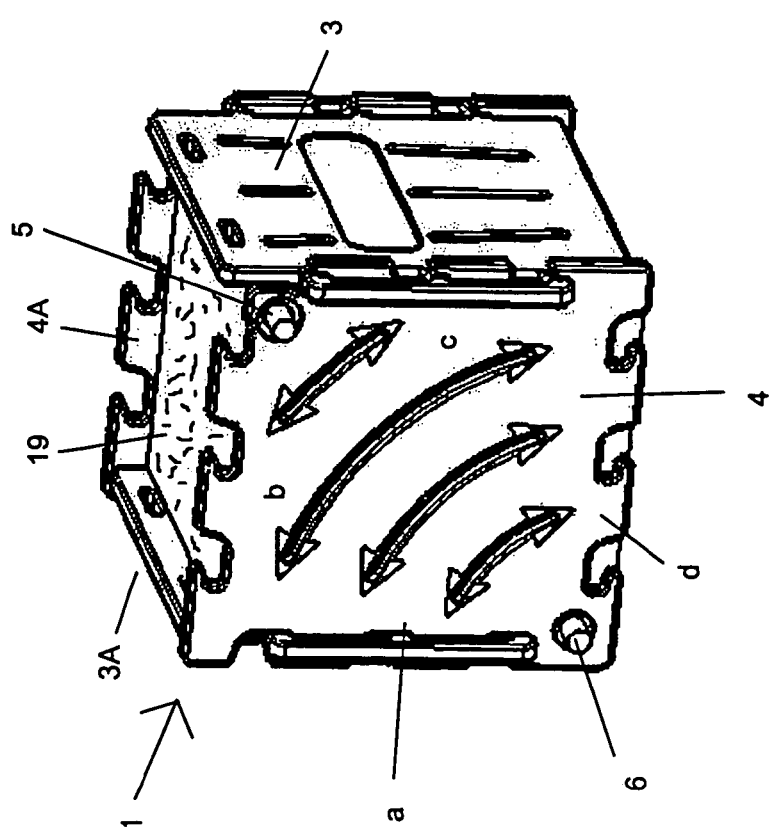

FIGS. 3A–3F illustrate a preferred manner of using the composting box. In FIG. 3A, composting compost pile 19 is maintained in composting box 1. After compost pile 19 is permitted to compost within composting box 1 for a period of time, side panels 3 and 3A are first removed, as shown in FIG. 3B, leaving main unit 2 in place around compost pile 19. Main unit 2 is then rotated approximately 90° in the direction indicated by arrow 20 in FIGS. 3C and 3D. Compost pile 19 remains in its original position and is now located adjacent to but outside of main unit 2. By rotating main unit 2 in this manner, first side a and third side c, which were originally oriented vertically, now form the bottom and top sides, respectively, of main unit 2. Similarly, second side b and fourth side d are now oriented vertically, with side d being adjacent from compost pile 19 and side b being positioned opposite from compost pile 19.

Main unit 2 is conveniently rotated by grasping and lifting connecting and spacing member 5. Accordingly, the dimensions and shape of connecting and spacing member 5 are suitably selected to accommodate these functions. It may be ergonomically designed, and may incorporate a grip or handle.

The preferred direction of rotation is fixed by the location of connecting and spacing members 5 and 6. As seen in FIGS. 3A–3F, when main unit 2 is in a resting position, one of the connecting and spacing members is positioned near the top of main unit 2 and the other is positioned near the bottom of main unit 2, at opposing corners. In FIG. 3A, for example, connecting and spacing member 6 is located at the bottom left of main unit 2, and connecting and spacing member 5 is located at the top right of main unit 2. The preferred direction of rotation is such that connecting and spacing members 6 and 5 remain at the bottom and top, respectively, of main unit 2, with connecting and spacing member 5 being shifted to the top left of main unit 2 and connecting and spacing member 6 remaining nearly stationary and becoming positioned at the bottom right of main unit 2. This direction of movement minimizes the movement of each connecting and spacing member through compost pile 19 as main unit 2 is rotated. This makes it easier to relocate main unit 2 without lifting its entire weight, as one corner remains on the ground and bears part of the load. This design also minimizes disruption of compost pile 19 as main unit 2 is rotated.

Figure 3D:
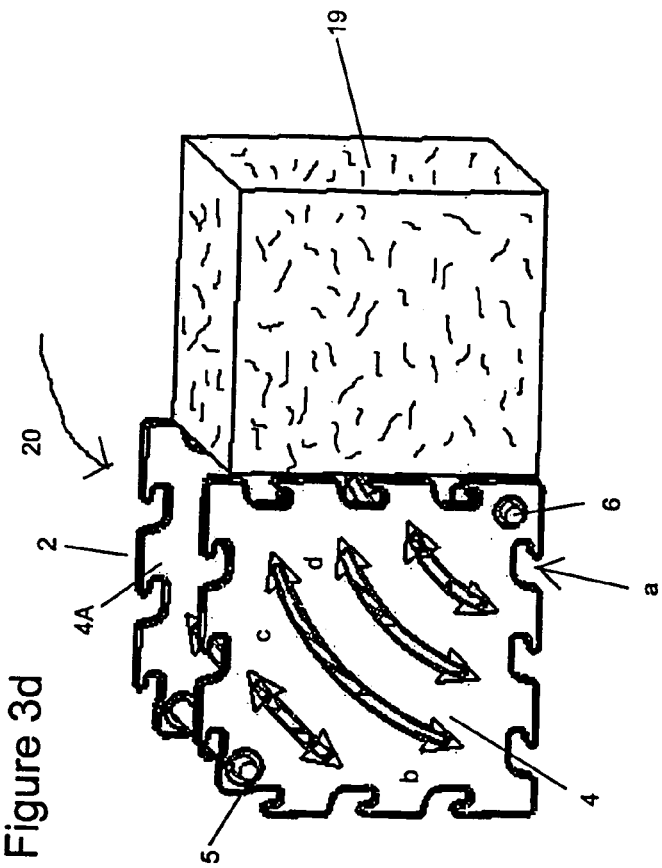
Figure 3C:
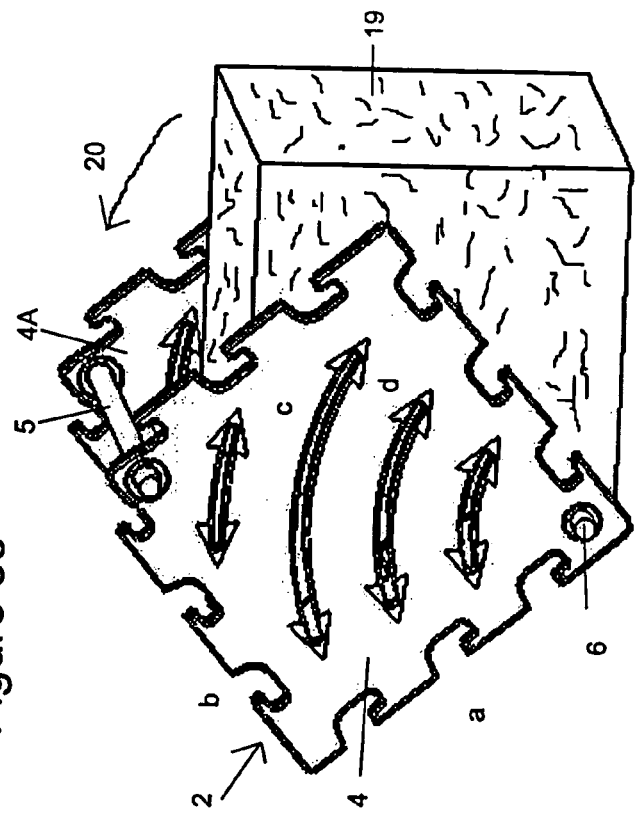
Figure 3E:
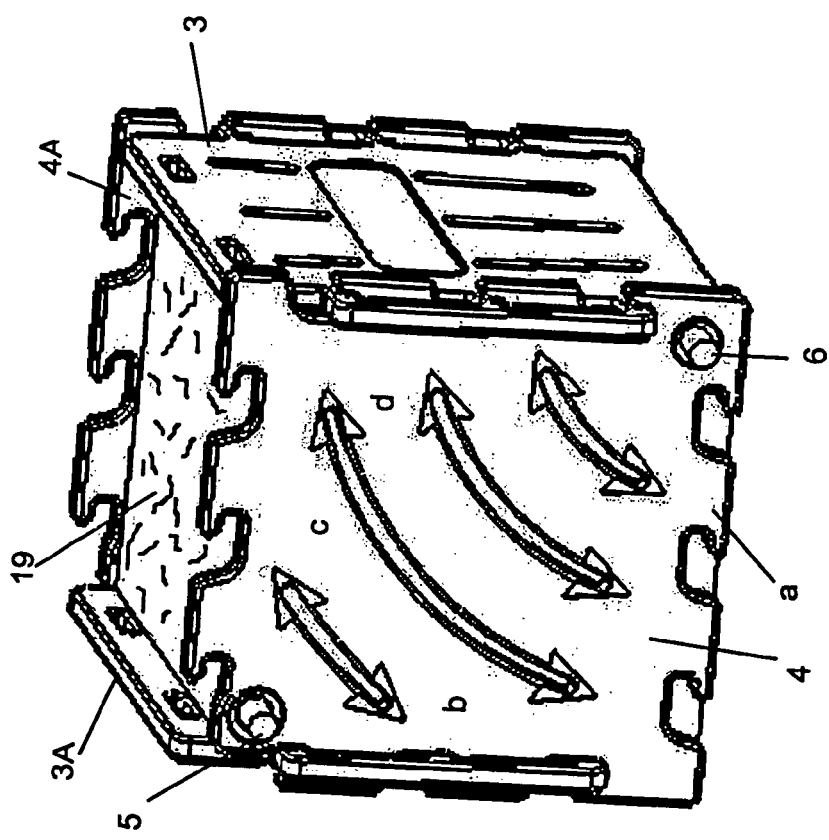
Figure 3F:
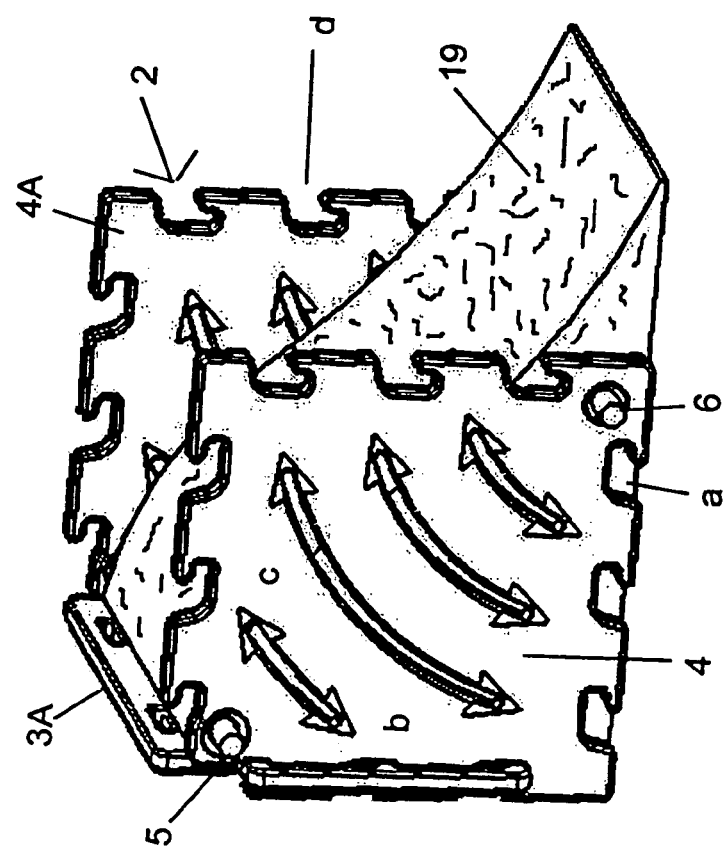

After main unit 2 is rotated into its new position, compost pile 19 is moved back into the main unit 2, as shown in FIG. 3E and side panels 3 and 3A are reattached, this time to second and fourth sides b and d. In the embodiment shown in FIGS. 1–3, side panel 3 is preferably attached to second side b before refilling composting box 1, and side panel 3A is preferably attached to side d after refilling composting box 1. This minimizes spillage and avoids the need to lift compost pile 19 up above the height of composting box 1 in order to refill the box. The result is that compost pile 19 is re-transferred into composting box 1, which is again configured with open top and bottom and four vertical side walls, as shown in FIG. 3F. Refilled composting box 1 is adjacent its original position.

Compost pile 19 is moved into main unit 2 by shoveling, using a pitchfork, or other convenient method. As the invention is designed primarily for residential or other small-scale uses, it is anticipated that in most cases compost pile 19 will be moved manually. Compost pile 19 is preferably moved in increments so it is aerated during the moving step. As can be seen from FIG. 3, much of the pile is simply pushed laterally or even downwardly into repositioned composting box 1, so that lifting is minimized.

This process can then be repeated one or more times. After allowing compost pile 19 to compost for a period of time in the position shown in FIG. 3F, side panels 3 and 3A are again removed, and main unit 2 is rotated 90°, in the opposite direction as before, to reassume its original position. Compost pile 19 is then transferred back into main unit 2 and side panels 3 and 3A reattached as before. The process is repeated as many times as desired until composting is complete. This method minimizes the ground area needed to maintain the pile, as an area no greater than about twice the area of the bottom opening of composting box 1 is necessary.

The embodiment shown in FIG. 1 includes several optional features. Main walls 4 and 4A and side panels 3 and 3A include aeration holes 16. These allow air to reach the compost pile from the sides and thus help with aeration. As shown, aeration holes 16 on main walls 4 and 4A are elongated arcs as shown. The orientation of the arcs indicates the correct direction of rotation of the unit to remove it from compost pile 19. Arrows 21 and 22 provide a further visual indication of the proper direction of rotation. Another optional feature, not shown, is a cover. Such a cover may take the form of another detachable side panel of the same general design as side panels 3 and 3A, which can be attached to main unit 2 via hooks 7 and reciprocal openings 7A and crossbars 7B.

The composting box of the invention can in some instances be used to maintain two or more compost piles simultaneously. This application takes advantage of a tendency of some compost piles to retain their shape when the composting box is removed, as illustrated in FIGS. 3C and 3D. To maintain multiple piles, a first pile is formed in the composting box of the invention. After composting for a period of time, typically on the order of about 2–7 days, the pile forms a somewhat cohesive mass. The composting box is then removed as described before, leaving a first shaped compost pile in place. The composting box is then refilled with additional composting material to form a second compost pile. As the second compost pile begins to compost in the composting box, the first pile continues composting as a free-standing mass. After a period of time, the composting box is removed from the second pile, which now forms a cohesive mass, and is positioned next to the first pile. The first pile is then transferred back into the composting box as described before, becoming aerated as it is transferred. This process is then repeated as desired, sequentially transferring and removing each pile from the composting box at periodic intervals. This approach can be used to simultaneously maintain two or more piles, such as from 2–6 piles, using a single composting box of the invention.

The composting method of the invention is useful with a wide range of compostable materials, such as household table scraps and garbage, leaves, grass clippings, other plant remains, as well as compostable plastics and other compostable materials. Compost material containing both high carbon and high nitrogen contents is especially useful. In general, no special composting conditions are required with this invention. Composting conditions are generally not critical, provided that temperatures are not so high as to damage the composting box and chemical compounds are not present that attack the composting box. The compostable material may be seeded with microbes or blended with nutrients if desired to promote the breakdown of the organic matter. Composting is generally completed within 3–6 weeks, although rates vary considerably with the starting materials and conditions.

In an alternate embodiment, the main unit of the composting box contains two or three fixed walls, two of which are on opposing sides of the box, and one or optionally two detachable side panels. A third wall may be permanently or detachably attached to the main unit, and is approximately perpendicular to the first and second fixed walls. The two or three walls forming the main unit may be attached to each other by connecting and spacing members at opposing corners, as in the embodiment illustrated in FIGS. 1–3, but this is not critical, and other attachment schemes can be used. Preferably, no spacing and connecting member is attached to at least one bottom corner of two opposing main walls where a detachable side panel is attached. This allows the composting box to be easily removed from a compost pile by sliding it or rolling it along the ground, without forcing a connecting and spacing member to pass through the pile. The main unit may include wheels or rollers on a bottom surface to facilitate movement away from the pile.

In this alternate embodiment, the main unit is positioned on a surface and filled with compostable material. The side panel or side panels are attached and the compostable material permitted to compost for a desired period of time. If one detachable side panel is used, it is attached opposite the third wall of the main unit. If two detachable side panels are used, they are attached on opposite sides of the main unit. A side panel is removed, and the main unit is removed from the compost pile by sliding or rolling the main unit away from the pile. As before, it is not necessary to lift the main unit to remove it from the compost pile. The compost pile can then be re-transferred back into the main unit as described before and the detachable side panels reattached to re-form the compost box. Aeration occurs during the step of moving the pile back into the box. Also as before, the compost box in this embodiment of the invention can be used to simultaneously maintain multiple compost piles.

Having described the invention generally, it will be recognized that various modifications can be made thereto without departing from the scope thereof as limited only by the appended claims.

What is claimed is:

1. A composting method comprising maintaining a compostable material in a composting box that includes a main unit and two detachable side panels, wherein the main unit includes first and second main walls held apart and substantially parallel to each other by two connecting and spacing members located proximate to diagonally opposing corners of the main walls, wherein said detachable side panels form a wall of the composting box when mounted to said main unit, wherein said main walls define opposing first and third sides of the composting box and opposing second and fourth sides of the composting box, and wherein said detachable side panels are adapted (1) to be detachably affixed to said main unit to form opposing walls on said first and third sides of the composting box and (2) to be detachably affixed to said main unit to form opposing walls on said second and fourth sides of the composting box.

2. The composting method of claim 1, further including the steps of (a) detaching at least one of said side panels from said main unit, (b) relocating said main unit by moving said main unit from the compostable material while leaving said compostable material substantially in place, (c) transferring said compostable material back into the relocated main unit and (d) then reattaching said side panel or side panels to the main unit.

3. The composting method of claim 2 wherein said main unit is relocated by sliding or rolling the main unit.

4. The composting method of claim 3 wherein a bottom surface of the main unit includes wheels or rollers.

5. The composting method of claim 1, wherein two or more composting piles are maintained simultaneously using a single composting box.

6. A composting method, comprising
   a) positioning a composting box on a surface, wherein the composting box includes a main unit and two detachable side panels, the main unit including first and second main walls held apart and substantially parallel to each other by two connecting and spacing members located proximate to diagonally opposing corners of the main walls, wherein said main walls define opposing first and third sides of the composting box and opposing second and fourth sides of the composting box, and wherein said detachable side panels are adapted (1) to be detachably affixed to said main unit to form opposing walls on said first and third sides of the composting box and (2) to be detachably affixed to said main unit to form opposing walls on said second and fourth sides of the composting box, said composting box being positioned such that said main walls are oriented substantially vertically and said detachable side panels are attached to said opposing first and third sides of the composting box and oriented substantially vertically;
   b) maintaining a compostable mixture in the composting box under compositing conditions;
   c) detaching said detachable side panels from the main unit;
   d) rotating said main unit while maintaining said main walls in a substantially vertical orientation, so that (1) the compost box is removed from the compostable mixture (2) said opposing first and third sides of the composting box become oriented substantially horizontally and (3) said opposing second and fourth sides of the composting box become oriented substantially vertically; then
   e) transferring said compostable mixture back into said main unit and attaching one of said detachable side panels to said second side and the other of said detachable side panels to said fourth side of the composting box.

7. The composting method of claim 6, wherein in step d), said fourth side is positioned adjacent said compostable material and second side is positioned opposite said compostable material, and in step e), a detachable side panel is attached to said second side prior to transferring said compostable material back into said main unit.

8. The composting method of claim 7, wherein in step e), a detachable side panel is attached to said fourth side after transferring said compostable material back into said main unit.

9. The composting method of claim 6, wherein two or more composting piles are maintained simultaneously using a single composting box.

* * * * *